Patented June 4, 1940

2,202,991

UNITED STATES PATENT OFFICE 2,202,991

POLYMETHINE DYES AND METHOD FOR PREPARATION THEREOF

Edmund B. Middleton, New Brunswick, N. J., assignor to Du Pont Film Manufacturing Corp., New York, N. Y., a corporation of Delaware No Drawing. Application May 12, 1937, Serial No. 142,283

12 Claims. (Cl. 260—240)

This invention relates to new and useful methine dyestuffs, more particularly polymethine dyes, and a method for the preparation thereof. The invention particularly relates to carbocyanine dyes containing a diazole radical of the oxygen group having the general formula

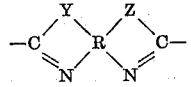

in which Y and Z represent members of the oxygen group of elements, e. g., oxygen, sulfur or selenium, and R represents an aromatic radical, preferably of the benzene or naphthalene series.

It is an object of the invention to prepare new and improved dyes which extend the range of sensitivity of gelatino silver halide photographic emulsions. A further object is the preparation of new and improved photographic plates, films and emulsions. Another object is to produce new and useful polymethine dyes. A still further object is to provide a new and useful method for producing said dyes. Other objects will appear hereinafter.

The invention will be illustrated more specifically with reference to carbocyanine dye salts containing in their molecules a dithiazole radical. These dyes may be prepared by the following steps:

(1) Preparation of dialkyl dithiazoles having the following formula:

(2) 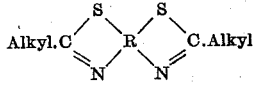

(2) Conversion of said dialkyl dithiazoles to their quaternary salts having the formula (3) 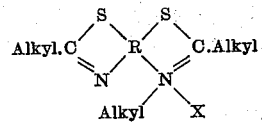

and (3), conversion of the quaternary salts to polymethine dyes. The symbol R in the foregoing formulas represents an aromatic radical, e. g., tolyl, xylyl, naphthyl, diphenyl, and other aromatic radicals in which two pairs of adjacent carbon atoms are part of the thiazole nuclei. If a dialkyl dioxazole salt or a dialkyl diselenazole salt is employed, the corresponding carbocyanines will be obtained.

In order to convert the diazole quaternary salts to symmetrical carbocyanines, it is preferable to react said salts with an ester of an ortho aliphatic carboxylic acid in the presence of a basic condensing agent, for example, pyridine, tri-n-propylamine, diethanolamine, triethanolamine, and the like. If a dye having an unsubstituted trimethenyl chain is desired, the reaction is effected with an alkyl ortho-formate, e. g., ethyl ortho-formate.

To produce dyes having an alkyl substituent on the central carbon atom, an alkyl ester of an acid having two or more carbon atoms is employed. For example, to form carbocyanines with a methyl radical on the central atom of the trimethenyl chain an alkyl orthoacetate is used, e. g., ethyl ortho acetate. When an alkyl ortho propionate is used, the central carbon atom of the trimethenyl chain contains an ethyl group.

Symmetrical and unsymmetrical carbocyanines may be produced by the diaryl amidine reaction which consists in (1) reacting one mole of a diaryl amidine, e. g., diphenyl formamidine, ditolyl formamidine, diphenyl acetamidine, diphenyl propamidine and higher homologues, with one mole of a diazole quaternary salt of the character described, for example, in Formula 3, supra, with or without an acylating agent and/or solvent, for example, acetic anhydride, propionic anhydride, and the like; and (2) reacting the resultant intermediate body with one mole of the same or another heterocyclic quaternary salt having a reactive aliphatic hydrocarbon group attached to a carbon atom alpha or gamma to a hetero nitrogen atom, preferably in the presence of acetic anhydride and sodium acetate, or other solvent and acid binding agent. To produce symmetrical carbocyanines the same quaternary salt is employed in Reactions 1 and 2. To produce unsymmetrical carbocyanines, different quaternary salts are used in Reactions 1 and 2. In either case, lateral carbon atom substitution on the trimethenyl chain may be obtained by using quaternary salts in Reaction 1, or 2, or both, in which the reactive aliphatic hydrocarbon group contains two or more carbon atoms, for instance, ethyl, propyl, and higher homologues. If diphenyl acetamidine or other diaryl higher alkyl amidine is used, central carbon atom substitution of the trimethenyl chain by alkyl radicals, e. g., methyl, ethyl, etc., may be obtained in either symmetrical or unsymmetrical dyes.

In order to produce dicarbocyanines, that is, dyes having a pentamethenyl chain and containing a diazole nucleus, two molecules of a diazole quaternary salt, e. g., as described in Formula 3, supra, are reacted with one mole of a beta anilino acrolein anil, muco bromic acid, muco chloric acid or similar type of condensing agent, characterized by being unsaturated compounds of a three carbon chain having reactive atoms or groups on the terminal carbon atoms which condense with the reactive alkyl groups of the quaternary salt with the elimination of an inorganic or organic acid, alcohol, ammonia, amine, mercaptan, or hydrocarbon.

If the diarylamidine reaction is carried out using a diazole quaternary salt in either step 1 or 2, e. g., a dithiazole salt of Formula 3, and another type of quaternary salt containing a single hetero nucleus in the other step, a wide variety of compounds may be formed. For instance, the compound having a single hetero nucleus may be a 2-methyl benzoselenazole ethiodide, a 2:5-dimethyl benzoselenazole ethiodide, a 2-ethyl benzoselenazole ethiodide, a 2-methyl benzoxazole ethiodide, a 2-methyl benzothiazole ethiodide, a 2:5-dimethyl benzothiazole ethiodide, a 2:4-dimethyl selenazolo ethiodide, a 2:4-dimethyl thiazolo ethiodide, a 2-methyl-4:5-diphenyl thiazolo ethiodide, a 2-methyl quinoline ethiodide, a 4-methyl quinoline ethiodide, and other similar or related quaternary salts.

In any of the quaternary salts herein referred to in this specification, one or more of the hydrogen atoms of the aromatic nuclei thereof may be substituted by auxochromic substituents, e. g., halogen (Cl, Br, I, F), alkoxy (methoxy, ethoxy, etc.), alkyl (methyl, ethyl, etc.), amino ($NH_2$), alkylamino (diethyl amino, etc.) and related groups.

Our preferred compounds may be illustrated by the following general formula:

(4)

in which A represents the radical (5)
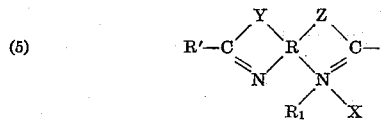

and $a$, $b$ and $a'$ represent hydrogen or alkyl, R' represents alkyl, Y and Z represent a member of the oxygen group of elements, $R_1$ represents alkyl, X represents the negative radical of an acid, R represents an aromatic radical of the benzene, naphthalene, or diphenyl series, B is a radical corresponding to the general formula of radical A or an N-alkyl radical of the oxazole, selenazole, thiazole, indolenine or alpha or gamma quinoline series.

Examples of compounds falling within the above formula are those having the following formula:

(6)
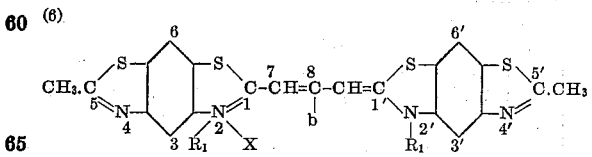

in which $R_1$ represents alkyl, $b$ represents hydrogen or alkyl, and X represents an anion as halogen, —$ClO_4$,—$CH_3SO_4$,—$C_2H_5SO_4$,p—$SO_3C_6H_4CH_3$ These compounds may be described generically as 2,5,2',5'-tetra-alkyl bisthiocarbocyanine salts.

The invention will be further illustrated but is not limited by the following examples, in which the quantities are stated in parts by weight.

EXAMPLE I

*The compound 1:5-dimethyl-benzobisthiazole having the formula*

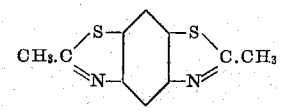

was prepared by the method of Edge (J. C. S. 722, 121 (1922)). The monoethiodide was prepared by heating the heterocyclic base, 1-5-dimethylbenzobisthiazole (M. P. 105–106° C.) with a slight molecular excess of ethyl iodide in a sealed tube at 100° C. for 2 to 3 hours. After recrystallizing from alcohol, a white crystalline material was obtained, (M. P. 225–226° C.) with some decomposition.

*Preparation of 2-2' diethyl 5-5'-dimethyl benzobisthiocarbocyanine iodide having the formula*

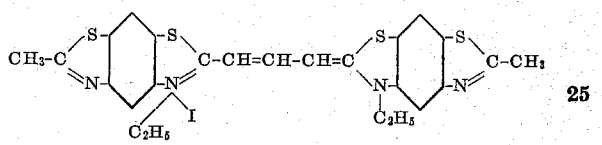

A mixture of .4 part of the ethiodide of 1-5-dimethyl benzobisthiazole, 15 pts. dry pyridine and .4 pt. ethyl orthoformate was refluxed for one-half hour. A bluish purple color developed and greenish crystals separated during the refluxing. After cooling, the dye was filtered, washed with water, and recrystallized from alcohol. Dull purple matted crystals with a faint greenish cast were obtained.

The dye is a photographic sensitizer and imparts to a silver bromide emulsion sensitivity extending to 655 mu. mu. with a maximum at 615 mu. mu.

EXAMPLE II

*Preparation of 2-2'-diethyl-5-5'-8-trimethyl-benzobisthiocarbocyanine iodide, having the formula*

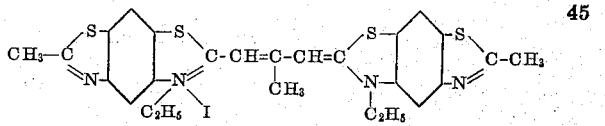

The dye was prepared as in the preceding example, using double the quantity of the ethiodide, and 1.1 pts. ethyl ortho-acetate instead of ethyl orthoformate. After recrystallizing from alcohol, dull purple matted crystals were obtained. Incorporated in a silver bromide emulsion, the dye imparts extra photographic sensitivity extending to 660 mu. mu. with a maximum at 625 mu. mu.

EXAMPLE III

*Preparation of 2-2'-8-triethyl-5-5'-dimethylbenzobisthiocarbocyanine iodide, having the formula*

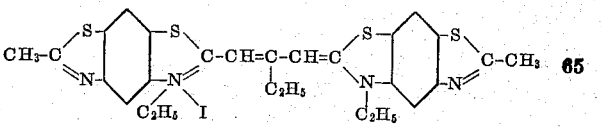

The dye was prepared as in the previous examples, substituting 1.5 pts. ethyl orthopropionate for ethyl orthoacetate. A yield of .2 part of a dull purple powder was obtained upon crystallizing from alcohol. As a photographic sensitizer incorporated in a silver bromide emulsion, the dye extends the normal sensitivity to 655 mu. mu. with a maximum at 620 mu. mu.

It will be apparent that according to the methods previously described specific polymethine dyes may be made. Thus, by starting with the appropriate intermediates, dyes may be prepared similar to Formula 6 but containing substituents in the 3, 6, 3' and 6' positions. Such substituents may be, for example, methyl, ethyl, chlorine, methoxy, ethoxy and related radicals, although the preferred substituents are alkyl radicals such as methyl and ethyl.

It is immaterial from the standpoint of the present invention in what manner the alkyl diazole quaternary salt is obtained as long as it contains an alkyl group on a carbon atom alpha to a quaternary nitrogen atom. The intermediate may, if desired, contain an alkyl group on only one of the carbon atoms alpha to the hetero nitrogen atoms of the heterocyclic nuclei, the other of said carbon atoms having a substituent other than alkyl. Thus, R' in Formula 5 may be phenyl, amino, halogen, mercapto or related radicals.

Thiazolic intermediates for use in accordance with the present invention may be prepared by any suitable series of reactions, for example, (1) reacting a salt of sulfocyanic acid on a primary aromatic diamine to produce a diaminodithiazole; (2) hydrolyzing the diaminodithiazole in order to split one or both rings thereof; and (3) converting the resultant alkali metal salt of a thiophenol to an alkyl dithiazole by treatment with an organic monocarboxylic acid anhydride. Instead of a salt of sulfocyanic acid, a salt of selenocyanic acid may be used, for example, cupric selenocyanate, and by a similar series of reactions an alkyl diselenazole may be prepared. As examples of diamines suitable for starting materials may be mentioned, o, m and p phenylenediamine, tolyl m diaminobenzene, 4:4'-diaminodiphenyl (benzidine), naphthylene diamines and other primary aromatic diamines having free positions adjacent the primary amino groups.

The new dyes may be used in dyeing fibrous materials but are especially useful for photographic purposes, for example, in gelatino silver halide photographic emulsions. The methods of preparing such emulsions and incorporating dyes therewith are well known.

As many apparently widely different embodiments of this invention may be made without departing from the spirit and scope thereof, it is to be understood that I do not limit myself to the specific embodiments thereof except as described in the following claims.

I claim:
1. A compound having the following general formula:

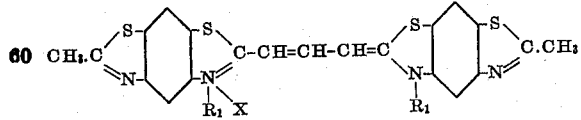

in which $R_1$ represents alkyl and X represents the negative radical of an acid.

2. A compound having the following general formula:

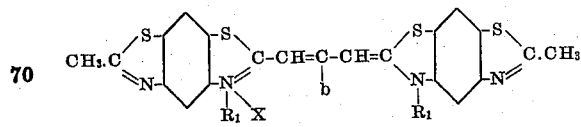

in which $R_1$ represents alkyl, $b$ represents alkyl and X represents the negative radical of an acid.

3. In the art of preparing polymethine dyes, the step which comprises reacting together an ester of an ortho aliphatic carboxylic acid and a benzobisthiazole alkyl quaternary salt containing a reactive alkyl group in a position alpha to a quaternary heterocyclic nitrogen atom and having the following general formula

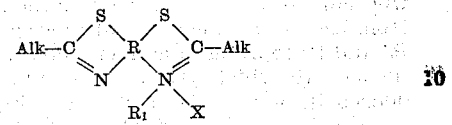

in which Alk represents a reactive alkyl group, $R_1$ represents alkyl, X represents the negative radical of an acid, R represents a phenylene nucleus to which the sulfur atoms are linked meta to each other and the nitrogen atoms are linked meta to each other, said reaction being effected under the influence of heat in the presence of an acid binding agent.

4. The method of preparing benzobisthiazole carbocyanine alkyl salts which comprises reacting a 1,5-dimethyl benzobisthiazole alkyl quaternary salt having the following general formula

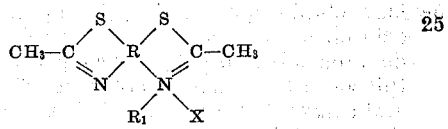

in which $R_1$ represents alkyl, X represents the negative radical of an acid and R represents a phenylene nucleus wherein the nitrogen atoms are linked meta to each other and the sulfur atoms are linked meta to each other, with ethyl orthoformate in the presence of a basic condensing agent under the influence of heat.

5. The method of preparing benzobisthiazole carbocyanine alkyl salts which comprises reacting a 1,5-dimethyl benzobisthiazole alkyl quaternary salt having the following general formula

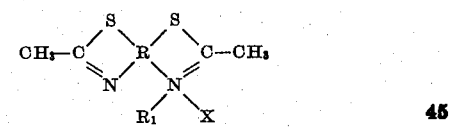

in which $R_1$ represents alkyl, X represents the negative radical of an acid and R represents a phenylene nucleus wherein the nitrogen atoms are linked meta to each other and the sulfur atoms are linked meta to each other, with ethyl orthoacetate in the presence of a basic condensing agent under the influence of heat.

6. The process which comprises heating together ethyl orthoformate and the monoethiodide of 1,5-dimethyl benzobisthiazole having the following general formula

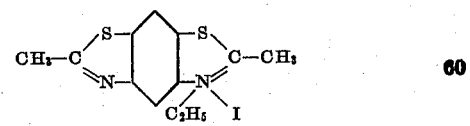

in the presence of an organic basic condensing agent.

7. The process which comprises heating together ethyl orthoformate and the monoethiodide of 1,5-dimethyl benzobisthiazole having the following general formula

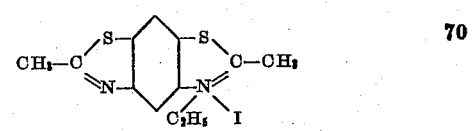

in the presence of pyridine.

8. A compound having the general formula

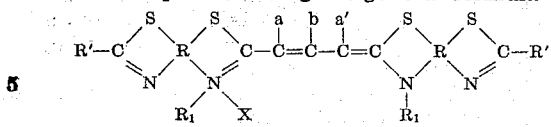

wherein $a$, $b$ and $a'$ represents a member selected from the group consisting of hydrogen and alkyl, $R'$ and $R_1$ represent alkyl, R represents a benzene nucleus to which the thiazole nuclei are condensed in ortho-positions, and X represents the negative radical of an acid, said compound having a symmetrical chemical structure disregarding the radical X, said compound being identical with that obtained by reacting an ester of an ortho carboxylic acid with a quaternary salt of a benzobisthiazole base having the general formula

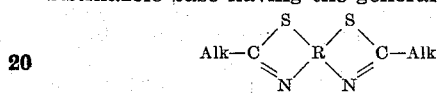

in which Alk is alkyl and R represents a benzene nucleus to which the thiazole nuclei are condensed in ortho positions, being identical with a base obtained by reacting a salt of sulfocyanic acid on a meta phenylene diamine to produce a diamino dithiazole, hydrolyzing the diamino dithiazole to an alkali metal salt of a thiophenol, and converting the resultant alkali metal salt of the thiophenol to an alkyl benzobisthiazole by treatment with an organic monocarboxylic acid anhydride.

9. A compound having the following general formula

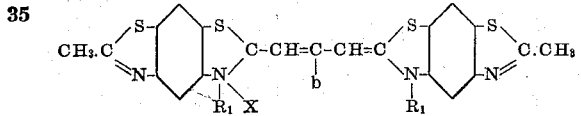

in which $R_1$ represents alkyl, $b$ represents a member selected from the group consisting of hydrogen and alkyl, and X represents the negative radical of an acid.

10. A compound having the following general formula

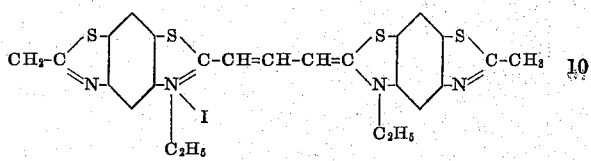

11. A compound having the following general formula

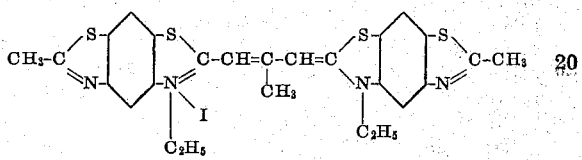

12. A compound having the following general formula

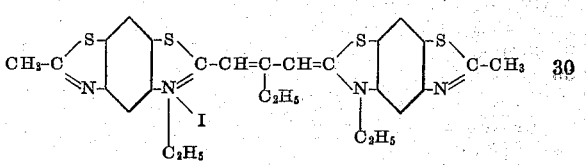

EDMUND B. MIDDLETON.